United States Patent

Goto et al.

Patent Number: 6,142,482
Date of Patent: Nov. 7, 2000

[54] CYLINDER HEAD GASKET

[75] Inventors: Eisaburo Goto; Ryosuke Fujiki; Kenichi Yamaguchi; Kazuya Nakata; Yoshikazu Shinpo, all of Toyota, Japan

[73] Assignee: Taiho Kogyo Co., Ltd., Toyota, Japan

[21] Appl. No.: 09/077,933

[22] PCT Filed: Oct. 3, 1997

[86] PCT No.: PCT/JP97/03546

§ 371 Date: Jun. 2, 1998

§ 102(e) Date: Jun. 2, 1998

[87] PCT Pub. No.: WO98/14723

PCT Pub. Date: Apr. 9, 1998

[30] Foreign Application Priority Data

Oct. 4, 1996 [JP] Japan ................................. 8-283304

[51] Int. Cl.⁷ .......................... F16J 15/08; F02F 11/00
[52] U.S. Cl. ................................... 277/591; 277/595
[58] Field of Search ........................... 277/591, 593, 277/594, 595

[56] References Cited

U.S. PATENT DOCUMENTS

| | | |
|---|---|---|
| 5,058,908 | 10/1991 | Udagawa . |
| 5,213,344 | 5/1993 | Udagawa . |
| 5,215,316 | 6/1993 | Udagawa . |
| 5,306,024 | 4/1994 | Udagawa . |
| 5,575,245 | 11/1996 | Watanabe . |
| 5,664,790 | 9/1997 | Tanaka et al. . |

FOREIGN PATENT DOCUMENTS

| | | |
|---|---|---|
| 4-165167 | 6/1992 | Japan . |
| 4-71865 | 6/1992 | Japan . |
| 4347065 | 12/1992 | Japan . |
| 7253162 | 10/1995 | Japan . |
| 8105544 | 4/1996 | Japan . |
| 8114266 | 5/1996 | Japan . |
| 8121597 | 5/1996 | Japan . |

*Primary Examiner*—Anthony Knight
*Assistant Examiner*—John L. Beres
*Attorney, Agent, or Firm*—Flynn, Thiel, Boutell & Tanis, P.C.

[57] ABSTRACT

A cylinder head gasket 1 comprises a pair of gasket baseplates 3 having a combustion chamber opening 3A formed therein, and a spacer 4 disposed around a cylinder bore 2 to surround it in an endless manner and held sandwiched between the pair of gasket baseplates 3. A full bead 3a and a half bead 3b are formed on each gasket baseplate in a region overlapped by the spacer 4, and the spacer as well as the full bead and the half bead are continuously held sandwiched between a cylinder head 5 and a cylinder block 6 along the circumference of the cylinder bore. The spacer allows the full bead and the half bead to be brought into abutment against the mating member under a high surface pressure and over a relatively extensive area of contact, whereby a good sealing performance is obtained in the presence of a gross porosity in the casting or flaw on the mating adjoined surface.

13 Claims, 3 Drawing Sheets

CYLINDER HEAD GASKET

TECHNICAL FIELD

The invention relates to an improvement of a cylinder head gasket of an engine.

BACKGROUND OF THE INVENTION

A cylinder head gasket is known in the art comprising a pair of gasket baseplates held sandwiched between a cylinder head and a cylinder block and having a combustion opening formed therein in alignment with a cylinder bore, a spacer disposed around the cylinder bore to surround it in an endless manner and held sandwiched between the pair of gasket baseplates and a full bead and/or half bead formed at a suitable location or locations on the gasket baseplates (Japanese Laid-Open Utility Model Application No. 71,865/1992 and Japanese Laid-Open Patent Application No. 165,167/1992).

In the prior art, when only gasket baseplates are provided which are formed with a full bead and a half bead, they are readily susceptible to the influence of any blowhole in the casting or flaw on mating adjoined surface, causing likelihood that the sealing performance becomes degraded.

DISCLOSURE OF THE INVENTION

In view of the foregoing, the invention provides a cylinder head gasket which assures and maintains a good sealing performance in the presence of any blowhole in the casting or flaw on the mating adjoined surface.

Specifically, in accordance with the invention, there is provided a cylinder head gasket comprising a pair of gasket baseplates held sandwiched between a cylinder head and a cylinder block and having a combustion opening formed therein in alignment with a cylinder bore, a spacer disposed around the cylinder bore to surround it in an endless manner and held sandwiched between the pair of gasket baseplates, and a full bead and a half bead formed on each of the pair of gasket baseplates in a region overlapped by the spacer, the spacer as well as the full bead and the half bead on the respective gasket baseplates being continuously held sandwiched between the cylinder head and the cylinder block along the circumference of the cylinder bore.

With the described arrangement, the full bead and the half bead on each of the gasket baseplates disposed around the combustion chamber opening are held sandwiched between the cylinder head and the cylinder block, and the spacer is interposed therebetween in such region. This allows the full bead and the half bead to abut against the mating member under a high surface pressure and over an increased area of contact, with consequence that they are less susceptible to the influence of any gross porosity in the casting or flaw on the mating adjoined surface, thus enabling a good sealing performance to be secured.

BEST MODES FOR CARRYING OUT THE INVENTION

The invention will now be described below with reference to an embodiment applied to a linear four cylinder engine.

Figure 1:
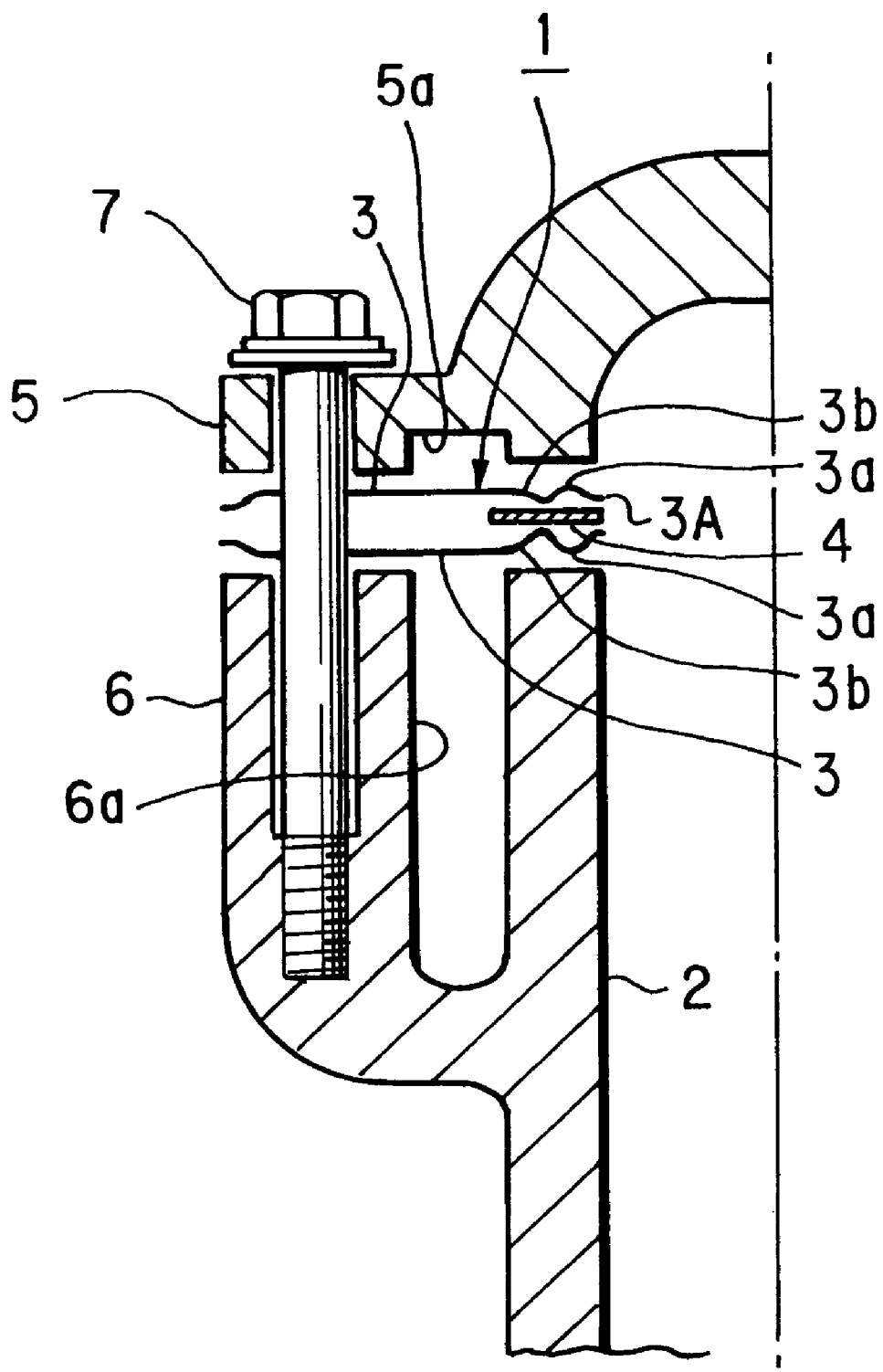
FIG. 1 is a longitudinal section of a first embodiment of the invention.
Figure 2:
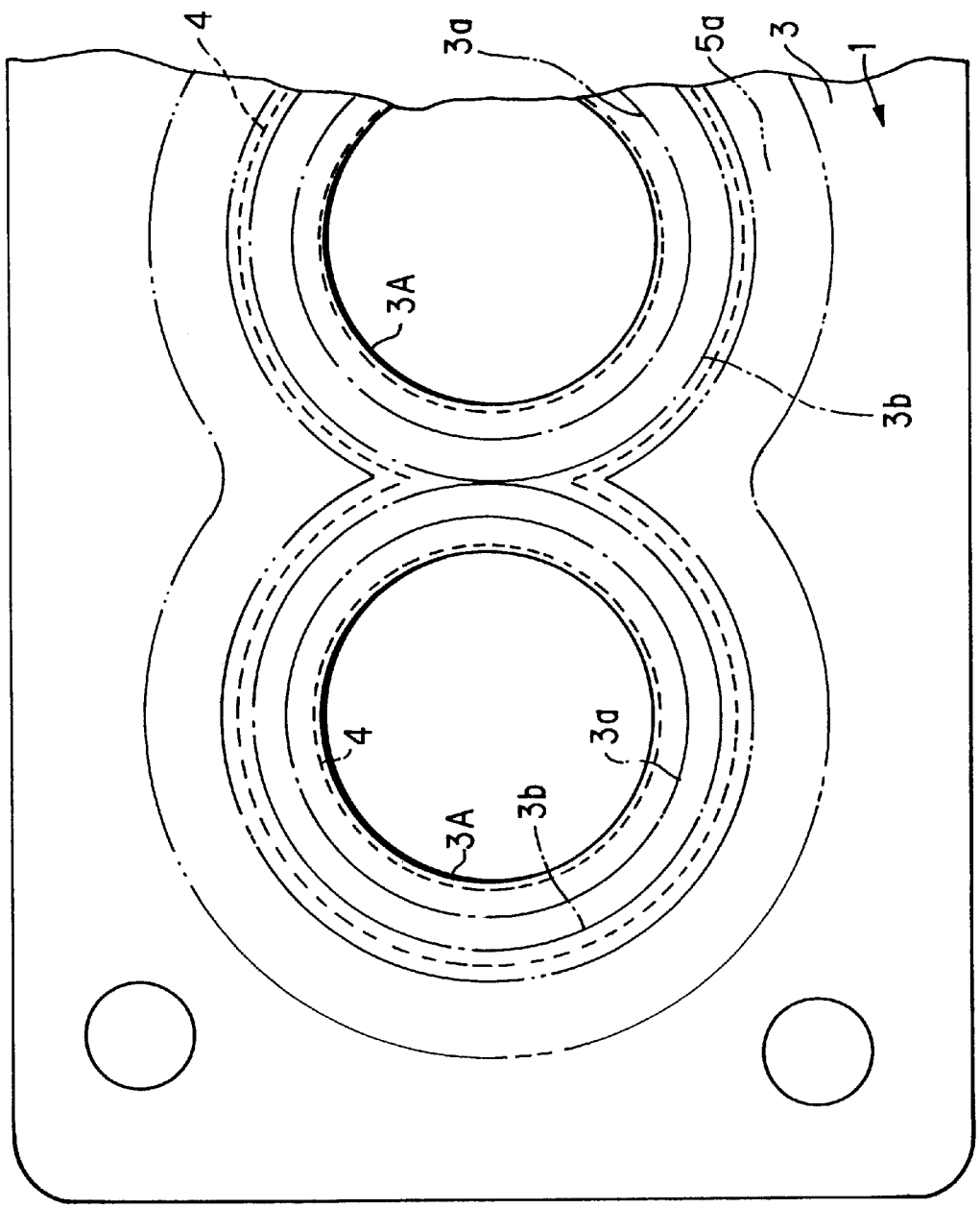
FIG. 2 is a plan view of cylinder head gasket 1 shown in FIG. 1.

Referring to FIGS. 1 and 2, a cylinder head gasket 1 comprises a pair of gasket baseplates 2 having four combustion chamber openings 3A formed therein in alignment with respective cylinder bores 2 (see FIG. 1) and a spacer 4 disposed between the pair of gasket baseplates 3 to be held sandwiched therebetween.

The spacer 4 is disposed around each cylinder bore 2 to surround it in an endless manner. However, in the embodiment shown, because a spacing between the cylinder bores 2, and hence, between the combustion openings 3A is reduced, four spacers 4 are integrally connected together between adjacent combustion openings 3A so as to be continuous to each other. Where there is an increased spacing between the combustion openings 3A, it will be obviously seen that the four spacers may be separate from each other.

In a region overlapped by the spacer 4, each gasket baseplate is formed with a full bead 3a and a half bead 3b, each of which surrounds the respective combustion opening 3A and is formed as a projection from the spacer 4. The full bead 3a and the half bead 3b are formed in the sequence named as viewed in a direction from the combustion openings to the outside thereof.

Figure 3:
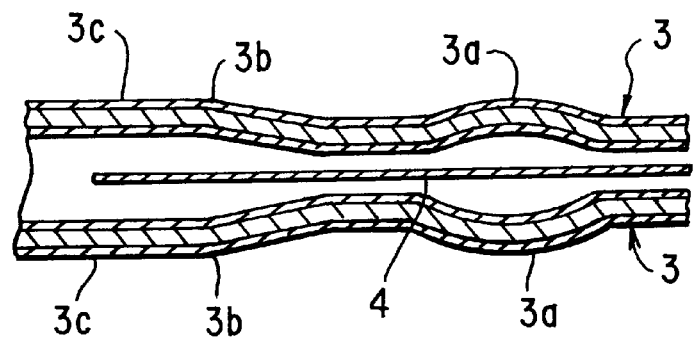
FIG. 3 is a cross section, to an enlarged scale, of a pertinent portion shown in FIG. 1.

SUS 301-H having a thickness of 0.20 mm, for example, may be used for each of the gasket baseplates 3. Preferably, its opposite surfaces are coated with NBR layers 3c, as shown in FIG. 3. For the spacer 4, SUS 304 having a thickness of 0.08 mm may be used. However, it should be understood that the thickness and the material of the gasket baseplate 3 may be suitably selected depending on the variety of an engine to which it is applied.

As shown in FIG. 1, the cylinder head gasket 1 is interposed between a cylinder head 5 and a cylinder block 6 of the engine and is held sandwiched therebetween to provide a sealing between the both by integrally connecting the cylinder head 5 and the cylinder block 6 by a clamping bolt 7.

In this example, the spacer 4 as well as the full bead 3a and the half bead 3b on the respective gasket baseplates 3 are continuously held sandwiched between the cylinder head 5 and the cylinder block 6 along the circumference of the cylinder bore 2, thus providing a safeguard preventing a circum-ferential continuity from being interrupted or preventing part of the half bead 3b which is located on the outer side from being trapped into cooling water passages 5a, 6a formed in the adjoining surfaces of the cylinder head 5 and/or the cylinder block 6 to prevent such part from being held sandwiched.

In the embodiment shown, the cylinder head 5 and the cylinder block 6 are formed as aluminum die-cast open decked blocks, and the cooling water passages 5a, 6a are formed in the adjoining surfaces of the cylinder head 5 and the cylinder block 6, respectively, so as to surround the four combustion openings 3A in an integral manner at a location on the outside of the outermost half bead 3b.

With the described construction, each of the combustion chamber openings 3A can be surrounded by the full bead 3a and the half bead 3b in an endless manner. In addition, since the spacer 4 is disposed in the region where the full bead 3a and the half bead 3b are provided, the full bead 3a and the half bead 3b can be brought into abutment against the cylinder head 5 and the cylinder block 6 under a high surface pressure and over a relatively extensive area of contact.

As a consequence, it is less susceptible to the influence of any gross porosity in the casting or flaw on the adjoining surfaces of the cylinder head 5 and the cylinder block 6, allowing a good sealing performance to be secured and maintained.

Figure 4:
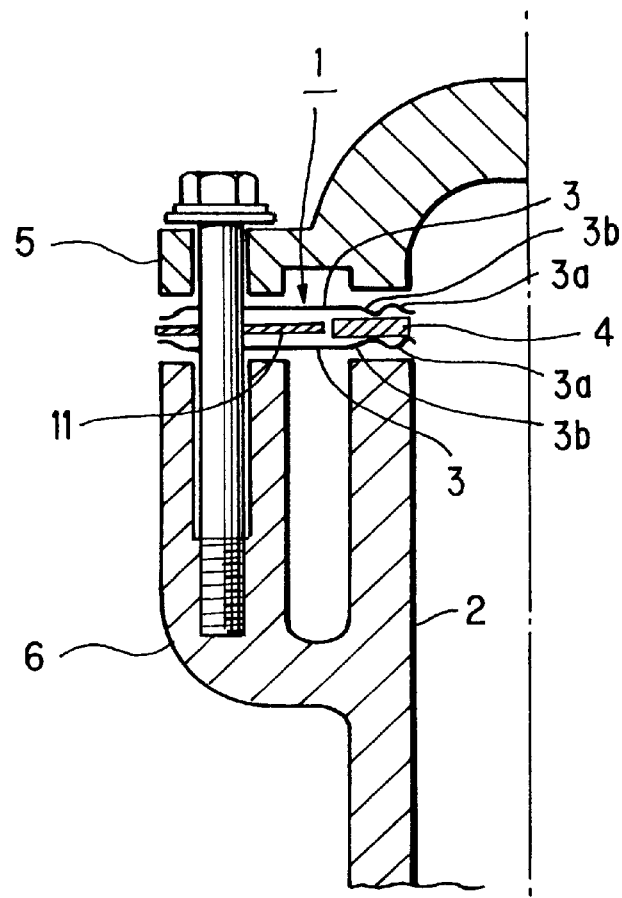
FIG. 4 is a longitudinal section of a second embodiment of the invention.

FIG. 4 shows another embodiment of the invention in which a reinforcing plate 11 of a reduced thickness than the spacer 4 is disposed on the outside of the spacer 4 of the first embodiment. The reinforcing plate 11 is held sandwiched between the pair of gasket baseplates 3, and a difference in the thickness between the reinforcing plate 11 and the spacer 4 in this embodiment is chosen to be equal to the thickness of the spacer 4 in the first embodiment.

Again, a similar function and effect is achieved as in the first embodiment, while allowing the rigidity of the entire cylinder head gasket 1 to be enhanced.

INDUSTRIAL APPLICABILITY

As described, according to the invention, the gasket is less susceptible to the influence of any gross porosity in the casting or flaw on the mating adjoined surfaces, permitting a good sealing performance to be secured.

What is claimed is:

1. A cylinder head gasket including a pair of gasket baseplates held sandwiched between a cylinder head and a cylinder block and having a combustion opening formed therein in alignment with a cylinder bore, a spacer disposed around the cylinder bore to surround the cylinder bore in an endless manner, said spacer being held sandwiched between said pair of gasket baseplates, and a full bead and a half bead formed on each of said pair of gasket baseplates in a region overlapped by said spacer, wherein the improvement comprises said full bead and said half bead extending continuously, completely around the circumference of the cylinder bore, the spacer as well as the full bead and the half bead on each gasket baseplate being continuously held sandwiched between the cylinder head and the cylinder block along the circumference of the cylinder bore; and a reinforcing plate of a reduced thickness which is less than the thickness of said spacer, said reinforcing plate being disposed outboard of said spacer, said reinforcing plate being held sandwiched between said pair of gasket baseplates.

2. In combination, a cylinder head, a cylinder block connected to said cylinder head and having a cylinder bore, and a cylinder head gasket, said cylinder head gasket including:

a pair of gasket baseplates sandwiched between said cylinder head and said cylinder block, said gasket baseplates including a combustion opening formed therein in alignment with said cylinder bore;

a spacer disposed around said cylinder bore to surround said cylinder bore in an endless manner, said spacer being held sandwiched between said pair of gasket baseplates, a full bead and a half bead being formed on each of said pair of gasket baseplates in a region overlapped by said spacer, said full bead and half bead extending continuously, completely around the circumference of said cylinder bore, said spacer and said full bead and half bead on each gasket baseplate being held sandwiched between said cylinder head and said cylinder block continuously along the circumference of the cylinder bore, at least one of said cylinder head and said cylinder block being formed as an open deck formed with a cooling water passage which surrounds said spacer and said full bead and half bead on each said gasket baseplate.

3. A combination according to claim 2, in which said cylinder head gasket includes a reinforcing plate of a reduced thickness which is less than the thickness of said spacer, said reinforcing plate being disposed outwardly of said spacer, said reinforcing plate being held sandwiched between said pair of gasket baseplates.

4. A combination according to claim 2, wherein said half bead is positioned radially outwardly of said full bead.

5. A cylinder head gasket according to claim 2, wherein said full bead is directly adjacent a combustion opening and has a central portion extending axially away from said spacer.

6. A cylinder head gasket according to claim 5, wherein a said half bead extends axially away from said spacer and is positioned radially outwardly from said full bead.

7. A cylinder head gasket including a pair of gasket baseplates held sandwiched between a cylinder head and a cylinder block and having a combustion opening formed therein in alignment with a cylinder bore, a spacer disposed around the cylinder bore to surround the cylinder bore in an endless manner, said spacer being held sandwiched between said pair of gasket baseplates, and a full bead and a half bead formed on each of said pair of gasket baseplates in a region overlapped by said spacer, wherein the improvement comprises said full bead and said half bead extending continuously, completely around the circumference of the cylinder bore, the spacer as well as the full bead and the half bead on each gasket baseplate being continuously held sandwiched between the cylinder head and the cylinder block along the circumference of the cylinder bore, said full bead being directly adjacent the combustion opening and having a central portion extending axially away from said spacer.

8. A cylinder head gasket according to claim 7, wherein said half bead extends axially away from said spacer and is positioned radially outwardly from said full bead.

9. A cylinder head gasket including a pair of gasket baseplates held sandwiched between a cylinder head and a cylinder block and having a combustion opening formed therein in alignment with a cylinder bore, a spacer disposed around the cylinder bore to surround the cylinder bore in an endless manner, said spacer being held sandwiched between said pair of gasket baseplates, and a full bead and a half bead formed on each of said pair of gasket baseplates in a region overlapped by said spacer, wherein the improvement comprises said full bead and said half bead extending continuously, completely around the circumference of the cylinder bore, the spacer as well as the full bead and the half bead on each gasket baseplate being continuously held sandwiched between the cylinder head and the cylinder block along the circumference of the cylinder bore, said half bead being positioned radially outwardly of said full bead.

10. A cylinder head gasket for use between a cylinder head and a cylinder block having a cylinder bore, the cylinder head gasket comprising:

a pair of gasket baseplates adapted to be sandwiched between a cylinder head and a cylinder block, said gasket baseplates having an opening formed therein for alignment with a cylinder bore;

an endless spacer adapted to be disposed around and surround a cylinder bore, said spacer being sandwiched between said pair of gasket baseplates, said gasket baseplates each having a full bead and a half bead formed thereon in a region overlapping said spacer, said full bead and said half bead extending along said endless spacer and being adapted to extend continuously completely around the periphery of said opening, said spacer and said full bead and said half bead in each gasket baseplate being continuously circumferentially stacked and adapted to be in turn held between a cylinder head and a cylinder block continuously along the circumference of a cylinder bore; and a reinforcing plate of a reduced thickness, which is less than the thickness of said spacer, said reinforcing plate being disposed outboard of said spacer, said reinforcing plate being held sandwiched between said pair of gasket baseplates.

11. A cylinder head gasket for use between a cylinder head and a cylinder block having a cylinder bore, the cylinder head gasket comprising:

a pair of gasket baseplates adapted to be sandwiched between a cylinder head and a cylinder block, said gasket baseplates having an opening formed therein for alignment with a cylinder bore;

an endless spacer adapted to be disposed around and surround a cylinder bore, said spacer being sandwiched between said pair of gasket baseplates, said gasket baseplates each having a full bead and a half bead formed thereon in a region overlapping said spacer, said full bead and said half bead extending along said endless spacer and being adapted to extend continuously completely around the periphery of said opening, said spacer and said full bead and said half bead in each gasket baseplate being continuously circumferentially stacked and adapted to be in turn held between a cylinder head and a cylinder block continuously along the circumference of a cylinder bore, said full bead being directly adjacent said opening formed in said gasket baseplate and having a central portion extending axially away from said spacer.

12. A cylinder head gasket according to claim 11, wherein said half bead extends axially away from said spacer and is positioned radially outwardly from said full bead.

13. A cylinder head gasket for use between a cylinder head and a cylinder block having a cylinder bore, the cylinder head gasket comprising:

a pair of gasket baseplates adapted to be sandwiched between a cylinder head and a cylinder block, said gasket baseplates having an opening formed therein for alignment with a cylinder bore;

an endless spacer adapted to be disposed around and surround a cylinder bore, said spacer being sandwiched between said pair of gasket baseplates, said gasket baseplates each having a full bead and a half bead formed thereon in a region overlapping said spacer, said full bead and said half bead extending along said endless spacer and adapted to extend continuously completely around the periphery of said opening, said spacer and said full bead and said half bead in each gasket baseplate being continuously circumferentially stacked and adapted to be in turn held between a cylinder head and a cylinder block continuously along the circumference of a cylinder bore, said half bead being positioned radially outwardly of said full bead.

* * * * *